(12) United States Patent
Suzuki et al.

(10) Patent No.: US 7,745,758 B2
(45) Date of Patent: Jun. 29, 2010

(54) ARC START METHOD IN CONSUMABLE ELECTRODE TYPE ARC WELDING METHOD

(75) Inventors: Yukimitsu Suzuki, Anjo (JP); Ichiro Arita, Anjo (JP); Satoru Yamasumi, Itami (JP); Masaru Seto, Kawanishi (JP); Takahisa Iizuka, Noda (JP); Kazuhiko Onoue, Kobe (JP); Kunio Uchikoshi, Kobe (JP)

(73) Assignees: Central Motor Wheel Co., Ltd., Anjo-shi (JP); Kawasaki Jukogyo Kabushiki Kaisha, Kobe-shi (JP)

( * ) Notice: Subject to any disclaimer, the term of this patent is extended or adjusted under 35 U.S.C. 154(b) by 447 days.

(21) Appl. No.: 11/370,182

(22) Filed: Mar. 8, 2006

(65) Prior Publication Data

US 2006/0213889 A1 Sep. 28, 2006

(30) Foreign Application Priority Data

Mar. 8, 2005 (JP) ............................. 2005-063700

(51) Int. Cl.
*B23K 9/06* (2006.01)
*B23K 9/12* (2006.01)

(52) U.S. Cl. ............................... 219/130.4; 219/137.71
(58) Field of Classification Search .............. 219/130.4, 219/137.71
See application file for complete search history.

(56) References Cited

U.S. PATENT DOCUMENTS 2,405,673 A * 8/1946 Scherl ........................ 219/73

FOREIGN PATENT DOCUMENTS

| JP | 60-108175 A | * | 6/1985 |
| JP | 3-60865 A | * | 3/1991 |
| JP | 7-9141 | | 1/1995 |
| JP | 7-185816 | | 7/1995 |
| JP | 9-253852 | | 9/1997 |
| JP | 11-347732 | | 12/1999 |

* cited by examiner

*Primary Examiner*—Stephen J Ralis
(74) *Attorney, Agent, or Firm*—Edwards Angell Palmer & Dodge LLP

(57) ABSTRACT

To provide an arc start method in a consumable electrode type arc welding method capable of firmly executing arc start and capable of executing high quality high speed welding by restraining a welding defect from being brought about therefor, at a portion of a wire projected from a welding tip, a temperature of a front end portion of the wire is made to be at a temperature higher than a temperature of a portion thereof near the welding tip. The front end portion of the wire is preheated to 300° C. or higher, preferably, 450° C. or higher. The front end portion of the wire is preheated by generating arc for preheating. The preheating arc is generated in a spot-like shape at a position near a terminal end portion of a predetermined welding line by constituting a current lower than a welding current.

6 Claims, 6 Drawing Sheets

Example of flowchart of arc start method executed by apparatus of the embodiment Example of flowchart of arc start method executed by apparatus of the embodiment A: Reference time from welding finish time
B: Reference temperature of wire front end oxidized ball

ARC START METHOD IN CONSUMABLE ELECTRODE TYPE ARC WELDING METHOD

BACKGROUND OF THE INVENTION

1. Field of the Invention

The present invention relates to an arc start method in a consumable electrode type arc welding method and, more particularly relates to an arc start method improving an arc start characteristic.

2. Description of the Related Art

In a related art, there is known a method of automatically carrying out arc welding by using a welding robot or the like. It is important in the automatic welding to firmly execute arc start. Therefore, there have been proposed various arc start methods in order to firmly carry out arc start (refer to, for example, Patent Reference 1, Patent Reference 2, Patent Reference 3, Patent Reference 4).

[Patent Reference 1] JP-A-7-9141
[Patent Reference 2] JP-A-9-253852
[Patent Reference 3] JP-A-7-185816
[Patent Reference 4] JP-A-11-347732

Meanwhile, according to the arc start methods disclosed in the respective patent references, when welding speed is slow, a serious problem is not posed. However, it becomes apparent that when the welding speed becomes a high speed of, for example, about 3 m per minute, a problem resulting from instability of arc start is posed. When investigated on the problem, the following knowledge is acquired. That is, according to an arc start instable state in arc welding, as shown by FIG. 1, there is brought about an arc interrupting phenomenon in which arc is temporarily extinguished within several 100 mS (milliseconds) after arc start and, thereafter, arc is reignited. In arc welding at normal speed, the welding speed is slow, a welding length per second is short (for example, when the welding speed is 60 cm/minute, a welding length per second is 1 cm) and therefore, even when the extinguishing and reigniting phenomenon is brought about, the phenomenon is difficult to emerge as a welding defect of an irregular bead, a deficiency in melting or the like. However, when the welding speed is fast, and the welding length per second is long (for example, when the welding speed is 3 in/minute, the welding length per second is 5 cm), the arc interrupting phenomenon of extinguishing and reigniting is easy to emerge as the welding defect of the irregular bead, the deficiency in melting or the like.

Hence, the inventors have investigated the reason of bringing about the arc interrupting phenomenon of extinguishing and reigniting. Generally, arc start in a consumable electrode type arc welding method is carried out by feeding a welding wire at a low speed and making the welding wire shortcircuit with a base metal. At this occasion, in the welding wire, an excessively large start current resulting from the shortcircuit flows instantaneously. Then, a portion of the welding wire projected from a welding tip is instantaneously and totally heated. When wire feeding thereafter is retarded, the arc length becomes excessively long, thereby extinguishing the arc, or the shortcircuit is not opened and a shortcircuit phenomenon continues over a long period of time and, by excessively heating the welding wire, the welding wire is melted to break at a middle thereof, or totally at the projected portion, a front end side thereof is blown by an arc force and arc is temporarily extinguished. Thereafter, arc is generated again at a new front end portion of the welding wire formed by shortcircuiting the wire again. Further, although in the case of the instantaneous arc interrupting phenomenon, it seems macroscopically as if the arc were continued as a result, depending on arc interrupting time, the phenomenon may emerge as a welding defect. Particularly, the arc interrupting phenomenon in high speed welding is liable to emerge as the welding defect of the irregular bead or the like.

SUMMARY OF THE INVENTION

The invention has been carried out in order to resolve the drawback of the related art and it is an object thereof to provide an arc start method in a consumable electrode type arc welding method capable of firmly executing arc start and capable of executing high quality, high speed welding by restraining a welding defect from being generated.

According to an arc start method of the invention, in a consumable electrode type arc welding method for executing welding by generating arc between a front end of a wire and a base metal while feeding the wire, at time of arc start at a welding start point, at a portion of the wire projected from a welding tip, a temperature of a front end portion of the wire is made to be at a temperature higher than a temperature of a portion thereof near to the welding tip.

According to the arc start method of the invention, at the welding wire projected from the welding tip, the front end side of the wire is made to be at the temperature higher than the temperature of the portion near to the welding tip. Therefore, even when the welding wire is heated by a start current in arc start, the temperature on the front end side is maintained at a high temperature. As a result, at the projected portion of the welding wire, the front end side is made to be easier to be melted to break than a root portion thereof, and it is restrained that a middle of the projected portion, or a total thereof is melted to break. Therefore, according to the arc start method, arc start can firmly be executed and therefore, high quality high speed welding can be executed by restraining a welding defect from being brought about.

DETAILED DESCRIPTION OF PREFERRED EMBODIMENTS

A detailed explanation will be given of specific embodiments of an arc start method of the invention in reference to the drawings as follows.

First Embodiment

Figure 1:
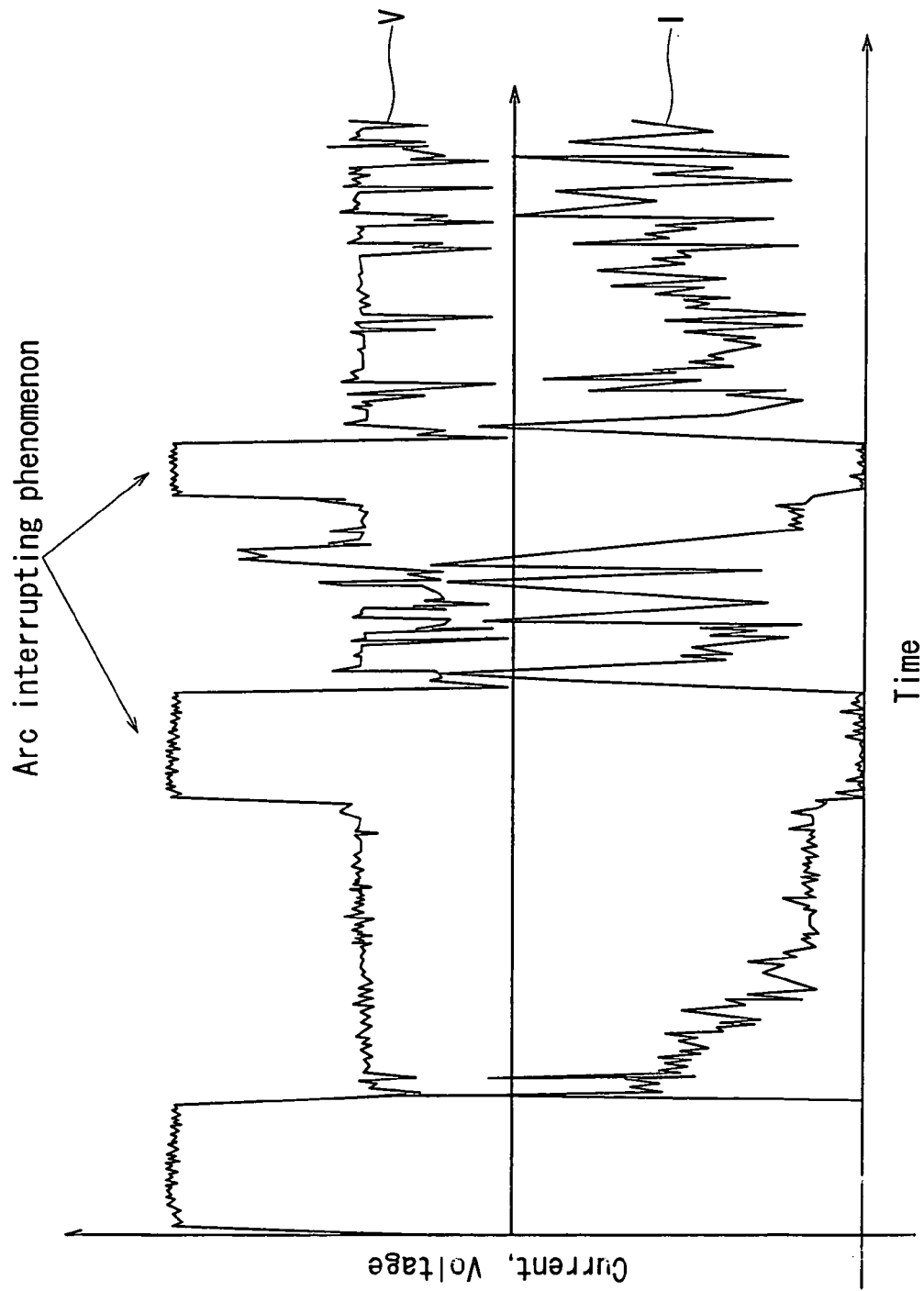
FIG. 1 shows welding voltage and current waveforms for explaining a problem posed in an arc start method of a related art.
Figure 2:
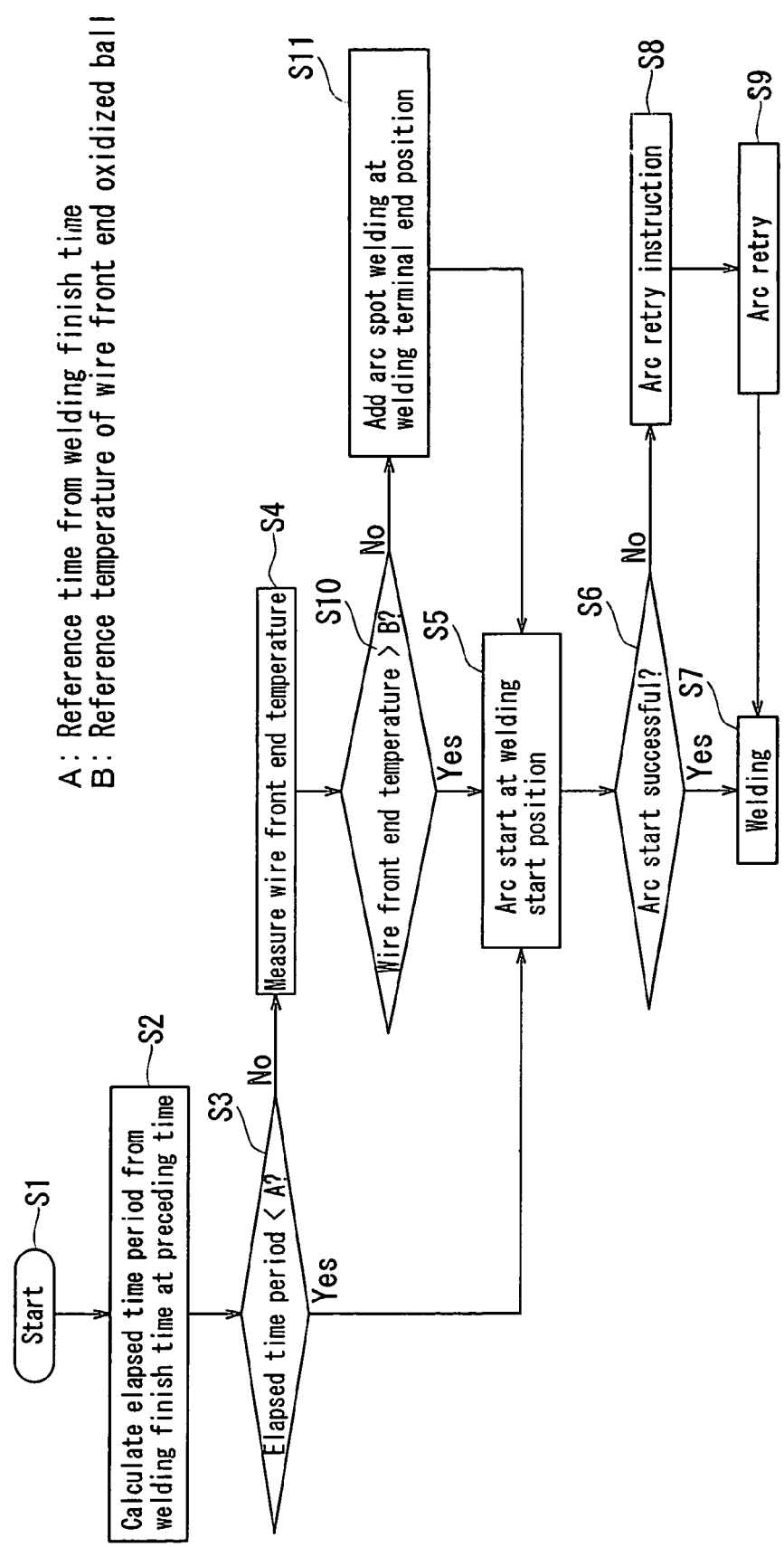
FIG. 2 is a flowchart diagram for explaining an embodiment of an arc start method according to the invention.

A first Embodiment will be explained. The embodiment shows a method of making a temperature of a wire front end portion higher than that of a portion near to a welding tip at a portion of a welding wire projected from the welding tip by generating dummy arc immediately before starting arc welding. A specific welding procedure will be explained. As shown by FIG. 2, when a welding torch is moved to a welding start point, an arc start signal is outputted and welding is started (step S1). At step S2, a time period elapsed from welding finish time at a preceding time to current time is calculated, successively, it is determined whether the elapsed time period is within a set time period A (step S3). When the elapsed time period is equal to or longer than the set time period A, the operation proceeds to step S4, further, when the elapsed time period is less than the set time period A, the operation proceeds to step S5. The step S5 is a step of executing arc start at an arc start position as normal. After the step S5, it is determined whether or not the arc start is successful at step S6. When successful, at step S7, welding is continued as it is. When arc start is not successful at step S6, the operation proceeds to step S8, a restart signal of arc is outputted, and at step S9, arc is restarted, then the operation proceeds to step S7 to continue welding. On the other hand, when the operation proceeds to step S4, that is, the elapsed time period from the welding finish time at the preceding time to current time is equal to or longer than the set time period A, at the step S4, a front end temperature of a welding wire is measured. Further, at next step S10, the front end temperature of the welding wire is compared with reference temperature B, and when the front end temperature of the welding wire is higher than the reference temperature B, normal welding operation at and after step S5 is carried out, while when the front end temperature of the welding wire is lower than the reference temperature B, the operation proceeds to step S11, arc spot welding is carried out at a welding finish end portion (welding terminal end portion), thereafter, the operation proceeds to step S5 to carry out normal welding operation.

Figure 3:
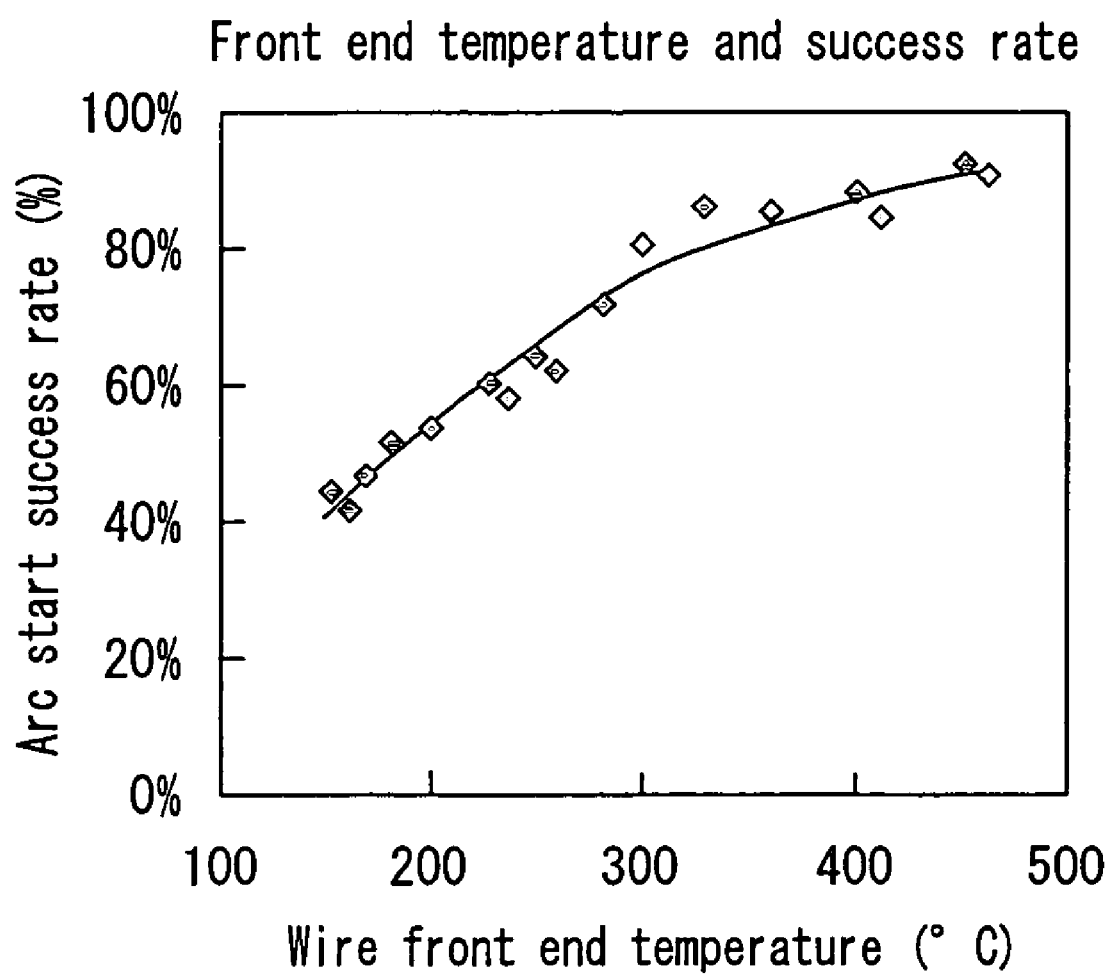
FIG. 3 is a graph showing a relationship between a wire front end temperature and an arc start success rate in an arc start method according to the embodiment.

The arc spot welding is carried out at the step S11 for making the temperature of the wire front end portion higher than that of a portion near to a welding tip in a portion of the welding wire projected from the welding tip. FIG. 3 shows a relationship between a welding wire front end temperature and an arc start success rate. Here, the arc start success rate signifies a rate of an acceptable product in which arc interrupting time is equal to or shorter than a reference value. More specifically, the arc start success rate signifies a rate of an acceptable product in which the arc interrupting time period is equal to or shorter than 50 ms.

As is apparent from FIG. 3, at a welding wire front end temperature equal to or higher than 300° C., the arc start success rate is improved. More particularly, at a welding wire front end temperature equal to or higher than 450° C., it is apparent that the arc start success rate is remarkably improved.

Second Embodiment

Figure 4:
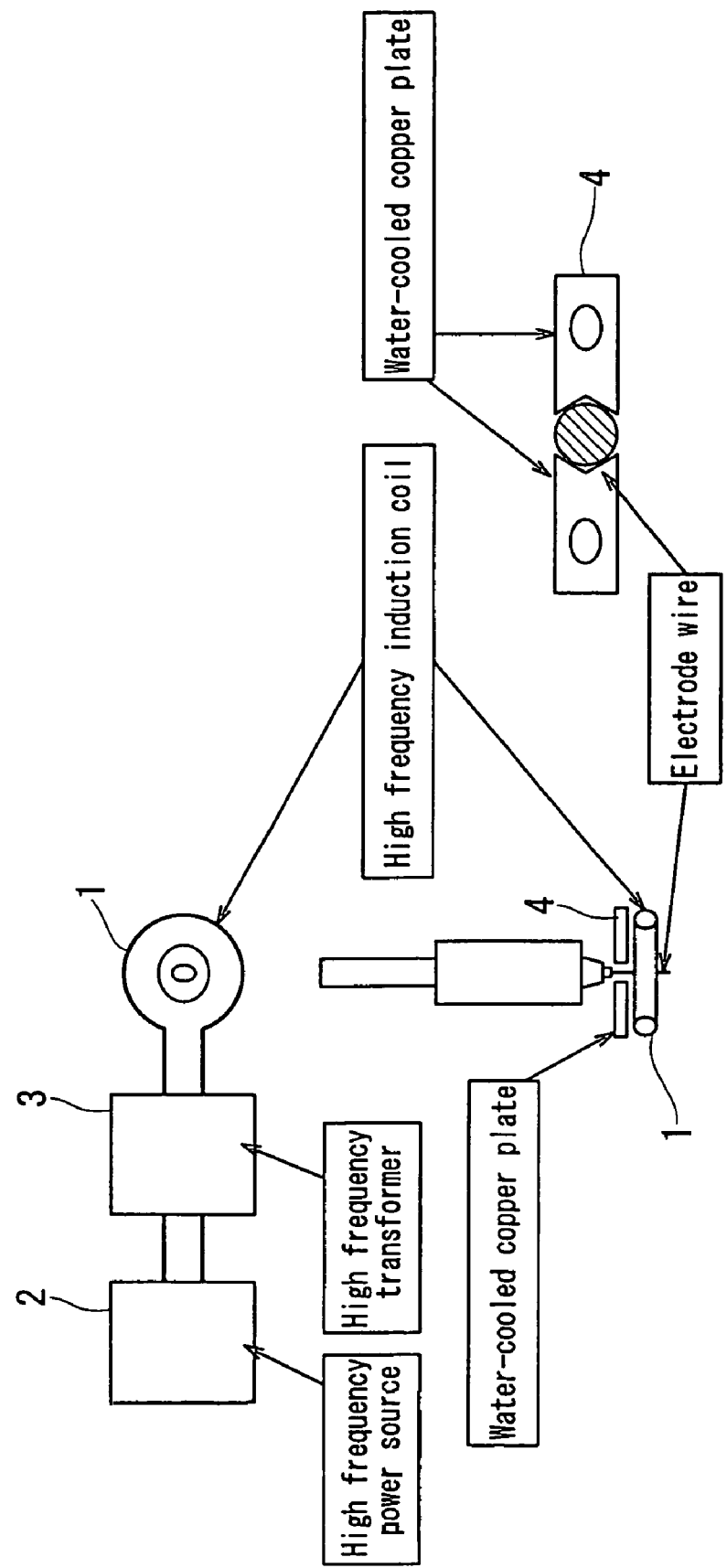
FIG. 4 is a schematic view for explaining a method of heating and cooling a wire front end portion according to a second embodiment.

Next, an explanation will be given of an embodiment when a wire front end portion is heated at a portion of the front end portion of the welding wire projected from the welding wire welding tip and a base end portion near the welding tip is cooled. FIG. 4 shows an example of an apparatus therefor. In the drawing, numeral 1 designates a high frequency induction heating coil arranged at a surrounding of the front end portion of the welding wire for heating the portion and is provided with a high frequency power source 2, and a high frequency transformer 3. Further, numeral 4 designates a water-cooled copper plate arranged on the base end side of the welding wire for cooling the portion. In the apparatus, whereas the wire front end portion is heated by the high frequency coil 1 the wire base end portion is cooled by the water-cooled copper plate 4.

Figure 5:
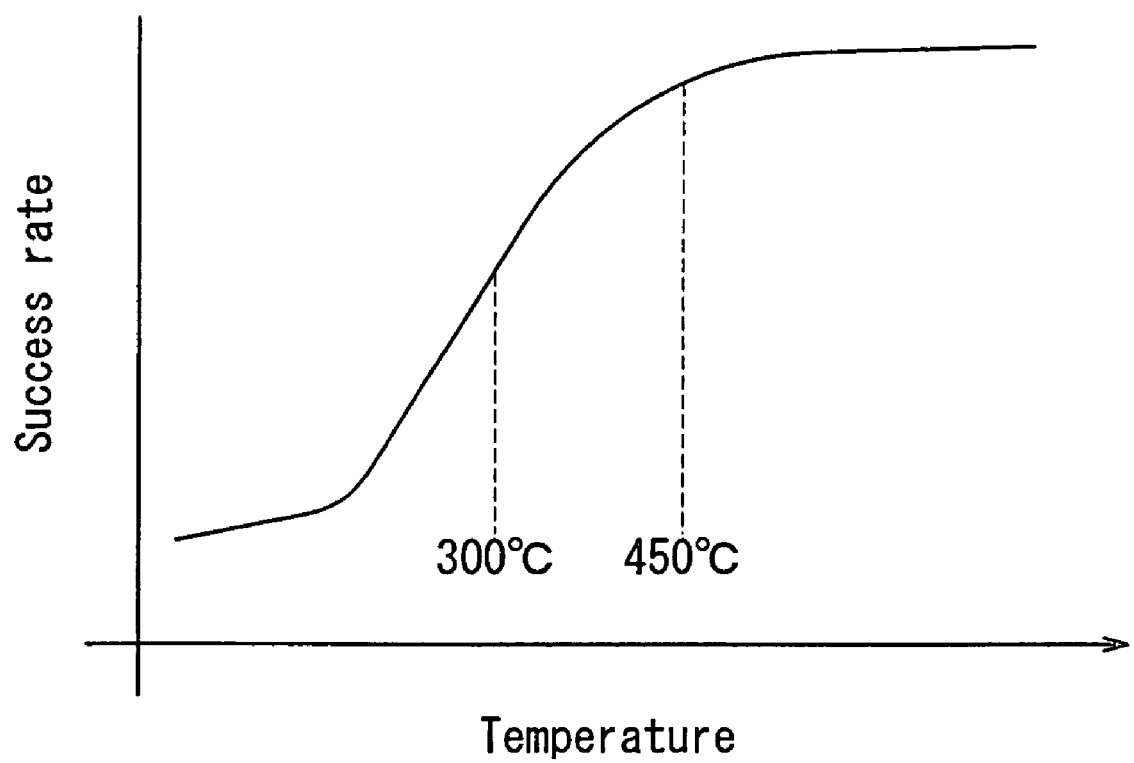
FIG. 5 is a graph showing a relationship between a wire front end temperature and an arc start success rate according to the second embodiment.
Figure 6:
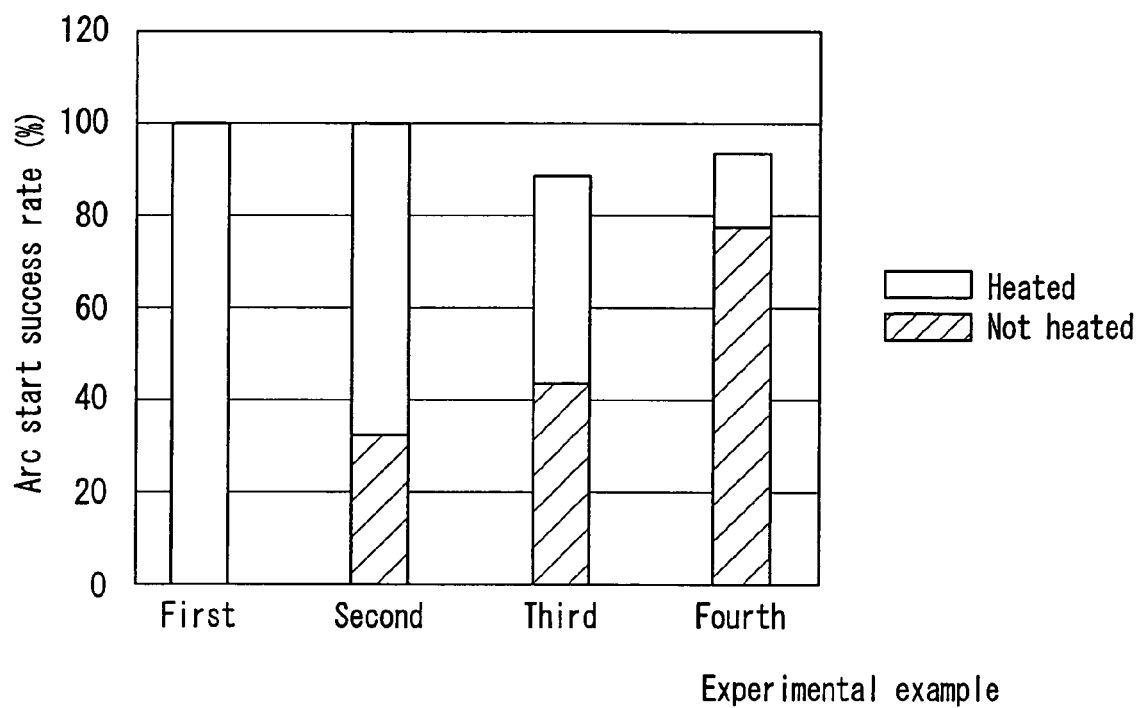
FIG. 6 is a graph showing the arc start success rate according to the second embodiment.

FIG. 5 and FIG. 6 show a test result by the apparatus. As shown by FIG. 5, the arc start success rate is improved when the welding wire front end temperature is 300° C. or higher, more particularly, the arc start success rate is remarkably improved when the welding wire front end temperature is 450° C. or higher. Further, FIG. 6 shows the success rate of arc start. As is apparent from the drawing, when the welding wire front end portion is heated (450° C. through 520° C.) (case of being heated), the excellent arc start success rate is acquired. In contrast thereto, when not heated (case of not being heated), an increase in the arc start success rate cannot be expected. Further, data of FIG. 6 shows a plurality of experimental examples (in this case, a first through a fourth experimental example). In addition, in the respective tests, a temperature of a base end portion of the welding wire (a portion cooled by the water-cooled copper plate 4) is maintained at about 80° C. through 120° C.

Further, a test similar to the above-described is carried out. According thereto, whereas the wire front end portion is heated by the high frequency coil 1 similar to the above-described, the wire base end portion is not cooled by the water-cooled copper plate 4 and a temperature rise is permitted in a state as it is. The arc start success rate in this case stays to be about 20 through 30% and a sufficient improving effect cannot be achieved. It is apparent therefrom that it is insufficient to simply heat the front end portion of the welding wire and it is necessary that while heating the welding wire front end portion, the base end portion must be maintained at the temperature lower than that of the welding wire front end portion.

Although an explanation has been given of the specific embodiments of the arc start method of the invention, the invention is not limited to the above-described embodiments but can be variously modified to embody within the range of the invention. For example, although according to the embodiments, before starting welding operation, the elapsed time period from the time of finally executing arc welding is measured and when the elapsed time period is equal to or longer than the reference time period, the wire front end temperature is measured, by measuring the elapsed time period from the time of finally executing arc welding and a surrounding temperature before starting the welding operation and predicting the current wire front end temperature, it may be determined whether the wire front end portion needs to be preheated.

The arc start method of the invention is characterized in a consumable electrode type arc welding method for executing welding by generating arc between a front end of a wire and a base metal while feeding the wire, in arc start at a welding start point, at a portion of the wire projected from a welding tip, a wire front end portion is made to be at a temperature higher than that of a portion thereof proximate to the welding tip.

According to the arc start method of the invention, in the welding wire projected from the welding tip, the wire front end side is at the temperature higher than that of the portion near the welding tip. Therefore, even when the welding wire is heated by a start current at arc start, the temperature on the front end side is maintained at high temperature. As a result, the front end side of the projected portion of the welding wire is easier to be melted to break than a root thereof, and a middle of the projected portion, or a total thereof is restrained from being melted to break. Therefore, according to the arc start method, the firm arc start can be carried out and therefore, high quality high speed welding can be carried out by restraining the welding defect from being brought about.

According to the arc start method, when the wire front end portion is preheated to a temperature equal to or higher than 300° C., the firm arc start can be carried out. Although the temperature of heating the welding wire front end portion is sufficient when the temperature is equal to or higher than 300° C., when the temperature is made to be equal to or higher than 450° C., the arc start can be carried out further firmly.

In the arc start method, when the wire front end portion is preheated by generating arc for preheating before starting welding operation, the method is easily embodied and when the method is embodied by a current lower than the welding current, an influence effected on the surrounding can be alleviated.

In the arc start method, when the arc for preheating is generated in a spot-like shape at a position near a terminal end portion of a predetermined welding line, the method can contribute to resolving a defect of a deficiency in excess weld metal (recess) and the like brought about at the welding terminal end portion.

In the arc start method, when heating means is provided, and the wire front end portion is preheated by operating the heating means, the temperature of the welding wire front end portion can firmly be made to rise.

Further, when the wire base end side is cooled in the preheating, a temperature difference between the front end portion and the base end portion of the projected portion of the welding wire can be firmly ensured and arc start can be carried out further firmly.

Further, in a case in which the wire front end temperature is measured before starting the welding operation and the wire front end portion is preheated when the wire front end temperature is equal to or lower than the reference temperature, in a case in which the elapsed time period from the time of finally executing arc welding is measured before starting the welding operation and the wire front end temperature is measured when the elapsed time period is equal to or longer than the reference time period, in a case in which the elapsed time period from the time of finally executing arc welding and the surrounding temperature are measured and it is determined whether the wire front end portion needs to be preheated by predicting the current wire front end temperature, the temperature of the front end portion of the welding wire is made to rise only when needed and therefore, the welding operation efficiency is promoted.

What is claimed is:

1. An arc start method in a consumable electrode type arc welding method for executing welding by generating arc between a front end of a wire and a base metal while feeding the wire, wherein at arc start time at a welding start point, at a portion of the wire projected from a welding tip, comprising the sequential steps of:
   generating an arc to preheat a front end portion of the wire to a temperature higher than a temperature of a portion of the wire near the welding tip prior to start of welding, the arc being produced by a current lower than a welding current in a spot-like shape at a position near a terminal end portion of a predetermined welding line;
   carrying out arc spot welding at a welding terminal end position;
   proceeding from the welding terminal end position to a welding start position; and
   starting an arc at the welding start position.

2. The arc start method according to claim 1, wherein the front end portion of the wire is preheated to a temperature equal to or higher than 300° C.

3. The arc start method according to claim 1, wherein the front end portion of the wire is preheated to a temperature equal to or higher than 450° C.

4. The arc start method according to claim 1, wherein an elapsed time period from time of finally executing arc welding is measured before starting welding and when the elapsed time period is equal to or longer than a reference time period, the temperature of the front end portion of the wire is measured.

5. The arc start method according to any one of claim 1 through claim 3, wherein an elapsed time period from the time of finally executing arc welding and a surrounding temperature is measured before starting welding and whether or not the front end portion of the wire needs to be preheated is determined by predicting a current temperature of the front end of the wire.

6. An arc start method in a consumable electrode type arc welding method for executing welding by generating arc between a front end of a wire and a base metal while feeding the wire, wherein at arc start time at a welding start point, at a portion of the wire projected from a welding tip, comprising the sequential steps of:
   measuring a temperature of the front end portion of the wire prior to starting of welding; and
   generating an arc to preheat a front end portion of the wire to a temperature higher than a temperature of a portion of the wire near the welding tip prior to start of welding whenever the temperature of the front end portion of the wire is equal to or less than a reference temperature,
   the arc being produced by a current lower than a welding current in a spot-like shape at a position near a terminal end portion of a predetermined welding line.

* * * * *